(12) United States Patent
Mikhemar et al.

(10) Patent No.: US 8,712,361 B1
(45) Date of Patent: Apr. 29, 2014

(54) METHOD AND SYSTEM FOR RECIPROCAL MIXING CANCELLATION OF WIDEBAND MODULATED BLOCKERS

(71) Applicant: Broadcom Corporation, Irvine, CA (US)

(72) Inventors: Mohyee Mikhemar, Aliso Viejo, CA (US); David Murphy, Costa Mesa, CA (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/683,896

(22) Filed: Nov. 21, 2012

(51) Int. Cl.
*H04B 1/10* (2006.01)
(52) U.S. Cl.
USPC ............................. 455/296; 455/305; 455/310
(58) Field of Classification Search
CPC .......... H04B 1/10; H04B 1/1027; H04B 1/12; H04B 15/00; H04B 15/06
USPC .......................................... 455/296, 305, 310
See application file for complete search history.

(56) References Cited

U.S. PATENT DOCUMENTS

| | | | | |
|---|---|---|---|---|
| 3,868,577 | A * | 2/1975 | Watt | 455/304 |
| 5,150,384 | A * | 9/1992 | Cahill | 375/375 |
| 5,584,062 | A * | 12/1996 | Meador et al. | 455/260 |
| 5,661,439 | A * | 8/1997 | Watkins et al. | 331/1 R |
| 5,930,306 | A * | 7/1999 | Boie | 375/332 |
| 6,573,769 | B1 * | 6/2003 | Zhang et al. | 327/156 |
| 8,126,420 | B2 * | 2/2012 | Koroglu et al. | 455/311 |

* cited by examiner

*Primary Examiner* — Simon Nguyen
(74) *Attorney, Agent, or Firm* — McDermott Will & Emery LLP (57) ABSTRACT

A method for reciprocal-mixing noise cancellation may include receiving, from a first mixer, a first signal comprising a wanted signal at a first frequency and a modulated signal at a second frequency. The modulated signal may be a product of a reciprocal-mixing of an unwanted signal with a phase noise. The second frequency may be greater than the first frequency, and at least a portion of the modulated signal may overlap the wanted signal, adding a reciprocal-mixing noise to the wanted signal. Using the first signal, a narrow second signal may be generated at a third frequency, twice the second frequency. At a second mixer, the second signal may be mixed with the first signal to generate a third signal. The third signal may be subtracted from the first signal to remove a reciprocal-mixing noise and to generate the wanted signal at the first frequency without the reciprocal-mixing noise.

20 Claims, 7 Drawing Sheets

METHOD AND SYSTEM FOR RECIPROCAL MIXING CANCELLATION OF WIDEBAND MODULATED BLOCKERS

TECHNICAL FIELD

The present description relates generally to radio frequency (RF) communications, and more particularly, but not exclusively, to reciprocal mixing cancellation of wideband modulated blockers.

BACKGROUND

The airwaves may be crowded with wireless signals, e.g., cellular signals, Wi-Fi signals, and/or other wireless signals. Accordingly, radio receivers may need to tolerate large blocker signals, e.g. unwanted signals that may interfere with a wanted signal. In addition, during down-conversion in a receiver, reciprocal mixing of the phase noise of a local oscillator (LO) with an unwanted blocker signal may deposit additive noise on top of the wanted signal. The undesirable effects of reciprocal mixing can be mitigated, in some instances, by filtering the unwanted blocker signal prior to down-conversion using strong radio frequency (RF) filters. However, the addition of strong RF filters may come at the expense of power, cost, and/or area. The undesirable effects of reciprocal mixing may also be mitigated by implementing oscillators that have minimal phase noise, such as LC-oscillators. However, the phase noise improvement of an LC-oscillator may also come at the expense of power, cost, and/or area.

The need exists for a low cost reciprocal mixing noise cancellation technique that has a potential for substantial reciprocal-mixing noise figure improvement independent of the LO phase noise.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1A:
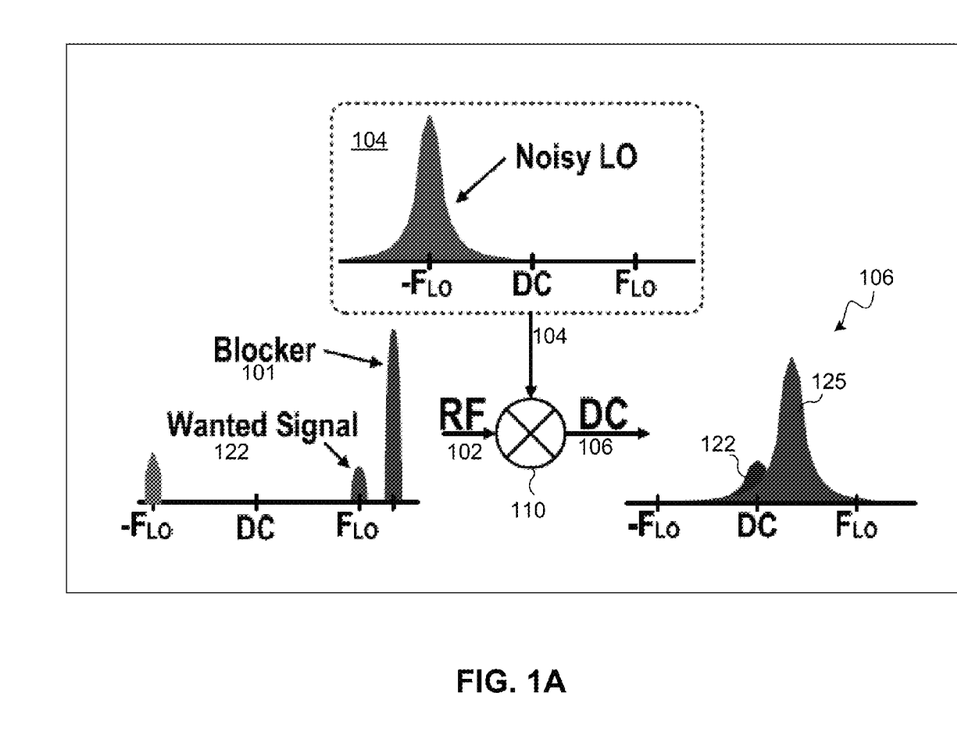
FIG. 1A illustrates an example down conversion mixer with a noisy local oscillator (LO) causing generation of reciprocal mixing noise.

FIG. 1A illustrates an example down conversion mixer 110 with a noisy local oscillator (LO) 104 causing generation of a reciprocal mixing noise. The down conversion mixer 110 may receive a radio frequency (RF) signal 102 and mix the RF signal 102 with the LO signal 104 to generate a baseband signal 106. The RF signal may include a wanted signal 122 (e.g., desired signal) at an operating frequency of the LO (e.g., LO frequency, $F_{LO}$), a corresponding image signal at a negative frequency, $-F_{LO}$, and a narrow band blocker 101 (e.g., an unwanted signal) at an offset from the $F_{LO}$. The LO signal 104 may be a noisy LO signal with a symmetrical phase noise frequency spectrum centered at $F_{LO}$ (and also with an image spectrum at $-F_{LO}$, as shown in FIG. 1A). The down conversion mixer 110 may down convert the RF signal 102 to generate the baseband signal 106 at near zero frequencies (e.g., DC).

Ideally, if the LO signal 104 was noiseless, one would expect the baseband signal 106 to be a replica of the RF signal 102 (i.e., the positive frequency portion of the signal) shifted down in frequency, by an amount equal to by $F_{LO}$, to DC. In practice, however, the other frequencies of the phase noise frequency spectrum of the noisy LO signal 104 may also mix with the narrow blocker to generate a wideband modulated blocker signal (hereinafter "modulated signal") 125 with a symmetrical reciprocal-mixing profile. The problem with this undesirable mixing is that a tail of the modulated signal 125 can superimpose the wanted signal 122 (at around DC) to deposit additional noise on the wanted signal 122. The subject technology make use of the symmetry of the phase noise around the LO frequency to mitigate the reciprocal mixing noise, as further explained herein.

Figure 1B:
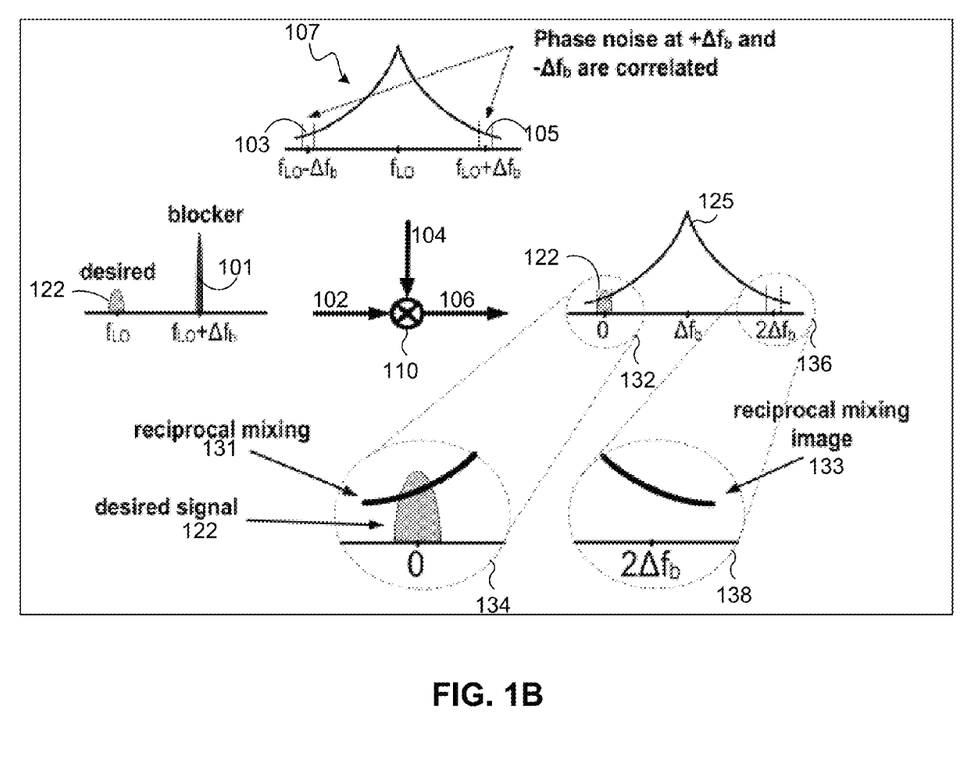
FIG. 1B illustrates an example symmetrical reciprocal mixing profile showing reciprocal mixing noise and its image.

FIG. 1B illustrates an example symmetrical reciprocal mixing profile showing reciprocal mixing noise and a corresponding image. A frequency spectrum 107 of the phase noise of the LO signal 104 is a symmetrical frequency spectrum centered at LO frequency ($f_{LO}$). Consequently, the phase noise at any positive offset from the LO frequency is an image of the phase noise at the same negative offset. For example, the phase noise 105 at an offset $\Delta f_b$ from the LO frequency is an image of the phase noise 103 at an offset $-\Delta f_b$ from the LO frequency.

When the phase noise with the symmetrical frequency spectrum 105 is mixed with a narrow blocker 101, a modulated signal 125 with a symmetrical reciprocal mixing profile centered at $\Delta f_b$ (e.g., the blocker beat frequency) may be generated. The tail of the modulated signal 125 around DC (e.g., portion 131) may be in the same frequency band (e.g., in-band) as the wanted signal 122 and thus indistinguishable from the wanted signal 122 (e.g., desired signal). It understood that the corresponding image of the in-band reciprocal mixing 131, located at $2\Delta f_b$ (e.g., 133) may be frequency shifted, and properly scaled to match the in-band reciprocal mixing 131. Thus, a subsequent subtraction of the shifted and scaled signal from the original signal, as further described herein, may result in near perfect cancellation of the reciprocal mixing noise. The subject disclosure describes a system and method for the frequency shifting, performing the proper scaling and matching, and the subsequent subtraction to cancel the reciprocal mixing noise of an example baseband signal. The portions 132 and 136 of the modulated signal 125 are blown-up and shown as portions 134 and 138, respectively, for more clear illustration of the in-band reciprocal mixing 131 and the corresponding image 133 of the in-band reciprocal mixing 131.

Figure 2A:
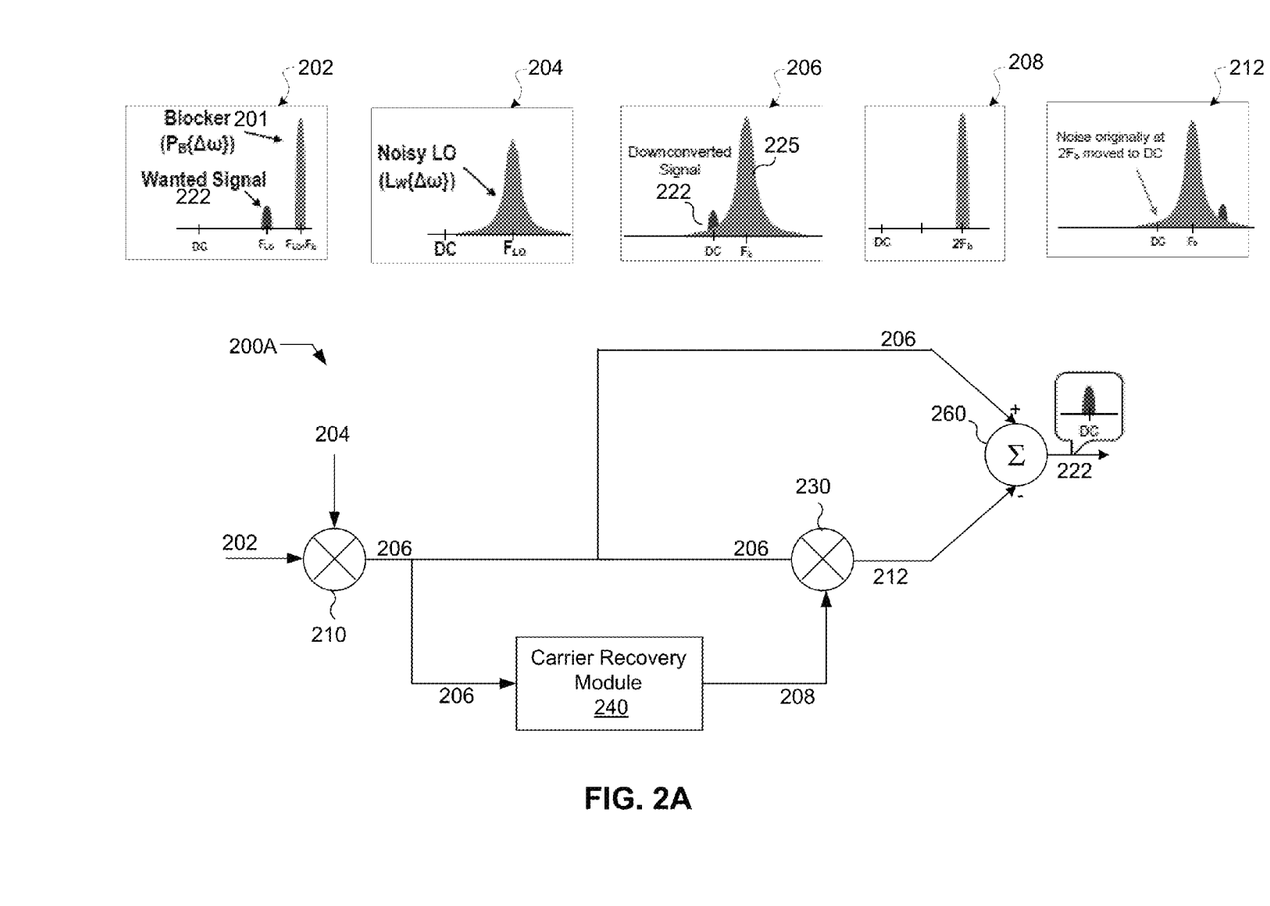
FIG. 2A illustrates an example system for reciprocal mixing noise cancellation in accordance with one or more implementations.

FIG. 2A illustrates an example system 200A for reciprocal mixing noise cancellation in accordance with one or more implementations. The system 200A includes a first mixer 210, a second mixer 230, a carrier recovery module 240, and a subtraction circuit 260. An RF signal 202 is down-converted by the first mixer 210 by mixing it with a LO signal 204 to generate a first signal 206, which is a baseband signal. The RF signal 202 may include a wanted signal 222 (e.g., desired signal) at LO frequency $F_{Lo}$ and a narrow blocker 201 at an offset frequency $F_b$, which corresponds to the blocker frequency. The LO signal 204 is a noisy Lo with a phase noise frequency spectrum centered at the LO frequency $F_{LO}$. The baseband signal 206 (hereinafter "signal 206") may include the wanted signal 222 down-converted to a first frequency (e.g., DC) and a modulated signal 225 at a second frequency (e.g., down-converted to blocker frequency $F_b$). The modulated signal 225 is the product of mixing of the narrow blocker with frequencies of the phase noise of the LO, and thus has a symmetrical frequency spectrum centered at $F_b$.

As discussed above with respect to FIG. 1B, the tail of the modulated signal 225 around DC may be in-band (e.g., 131 of FIG. 1B) with respect to the wanted signal 222, and thus may be indistinguishable from the wanted signal 222. The system 200A may provide for generating a mirror image of the frequency spectrum of the signal 206 and subtraction of the mirror image from the signal 206 to produce the wanted signal 222, free from the reciprocal mixing noise.

The carrier recovery module 240 may be configured to generate a second signal (e.g., a signal 208) from the signal 206. The signal 208 may be a narrow signal at a third frequency equal in value to twice the second frequency (e.g., at twice the blocker frequency $F_b$). At the second mixer 230, the signal 208 may be mixed with (e.g., multiplied with, in the time domain) the signal 206 to generate a signal 212. The signal 212 may have a frequency spectrum, which is a mirror image of the frequency spectrum of signal 206 and in which the wanted signal is shifted upward in frequency by the amount of 2Fb. One important note here is that, in the signal 212, the reciprocal mixing noise, originally at $2F_b$ in the signal 206, has moved to DC. Thus, upon subtraction in a subtraction module 260 of the signal 212 from the signal 206, the wanted signal 222 may be obtained. The wanted signal 222 produced by the subtraction module 260 may be free from the reciprocal mixing noise, as was the objective of the system 200A. In an aspect, the second mixer 230 may be a complex mixer configured to generate in-phase and quadrature (IQ) outputs.

Figure 2B:
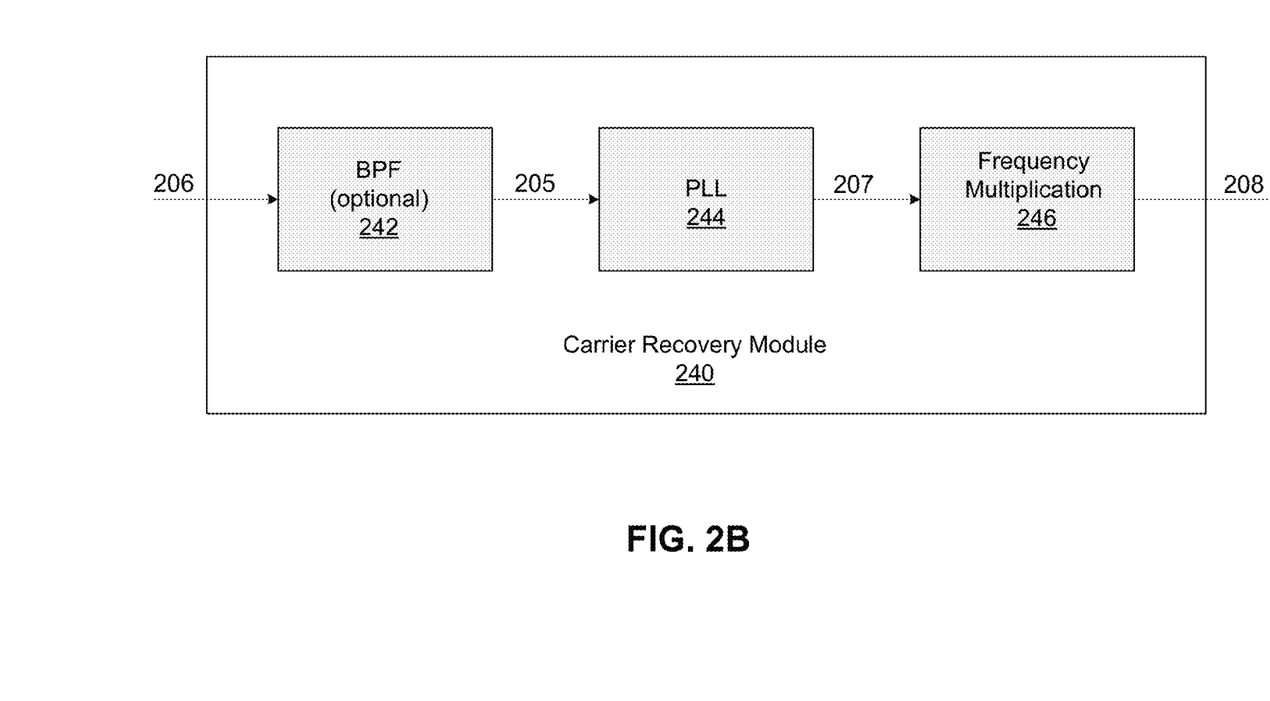
FIG. 2B illustrates an example carrier recovery module of the system of FIG. 2A in accordance with one or more implementations.

FIG. 2B illustrates an example carrier recovery module 240 of the system 200A of FIG. 2A in accordance with one or more implementations. The carrier recovery module 240 may include an optional band-pass filter 242, a phase lock loop (PLL) 244, and a frequency multiplication circuit 246. The band-pass filter 242 may be configured to have a pass band around the blocker frequency $F_b$ and to clean up the rest of the signal (e.g., the reciprocal mixing noise) to form a filtered signal 205. The use of the band-pass filter 242 may be optional, but may improve the performance of the carrier recovery module 240. The filtered signal 205 may be used by the PLL 244 to lock to the blocker frequency $F_b$, and generate a locked signal 207, at a substantially precise frequency of $F_b$. But, what is needed for the second mixing at the second mixer 230 of FIG. 2A is a signal at the frequency of $2F_b$. This is the role of the frequency multiplication circuit 246, which may be configured to multiply the frequency of the locked signal 207 by two, and generate the signal 208 at the frequency of $2F_b$. The detailed description of the band-pass filter 242, the PLL 244, and the frequency multiplication circuit 246 are known in the art and, for the sake of brevity, are omitted from the discussion here.

Figures 2C, 2D:
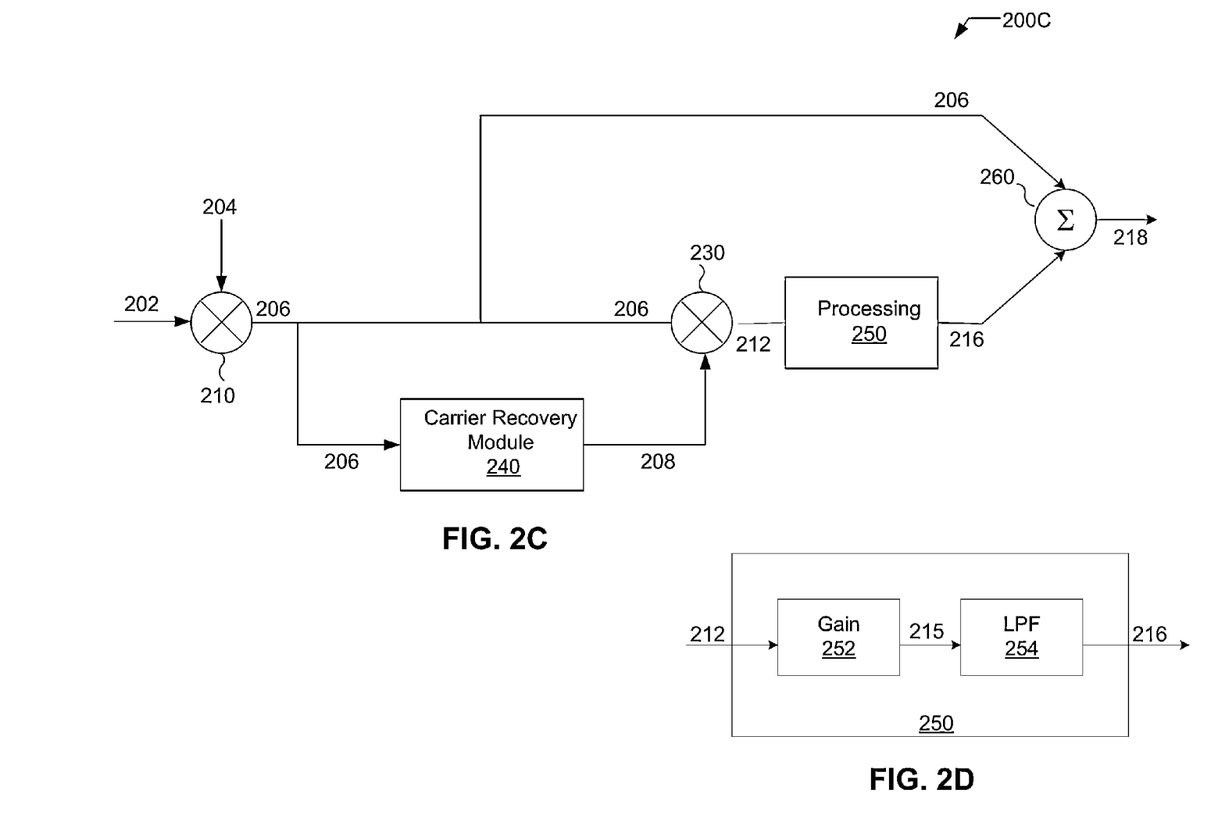
FIG. 2C illustrates an example system for reciprocal mixing noise cancellation in accordance with one or more implementations.
FIG. 2D illustrates an example processing module of the system of FIG. 2C in accordance with one or more implementations.

FIG. 2C illustrates an example system 200C for reciprocal mixing noise cancellation in accordance with one or more implementations. The system 200C is similar to the system 200A of FIG. 2A, except for the addition of the processing module 250 between the second mixer 230 and the subtraction module 260. The processing module 250 may provide additional gain and filtration to the signal 212 to generate a signal 216 which is properly scaled and matched, so that when subtracted from the signal 206, may generate the wanted signal 218, which may be considered as being substantially free from the reciprocal mixing noise.

FIG. 2D illustrates an example processing module 250 of the system 200C of FIG. 2C accordance with one or more implementations. The processing module 250 may include a gain stage 252 and a low-pass filter (LPF) 254. The gain stage 252 may be configured to adjust the strength of the signal 212 to a level that the reciprocal mixing noise in DC portion of a signal 216 can match with the same in the signal 206. The LPF 254 may be configured to remove components additional noise, originated in the previous stages such as the second mixer 230 and the gain stage 252, to generate a clean, properly matched and scaled signal 216. In an aspect, the LPF 254 may be combined with the gain stage 250. The detailed description of the gain stage 252 and the LPF 254 are known in the art and, for the sake of brevity, are omitted from the discussion here.

Figure 3:
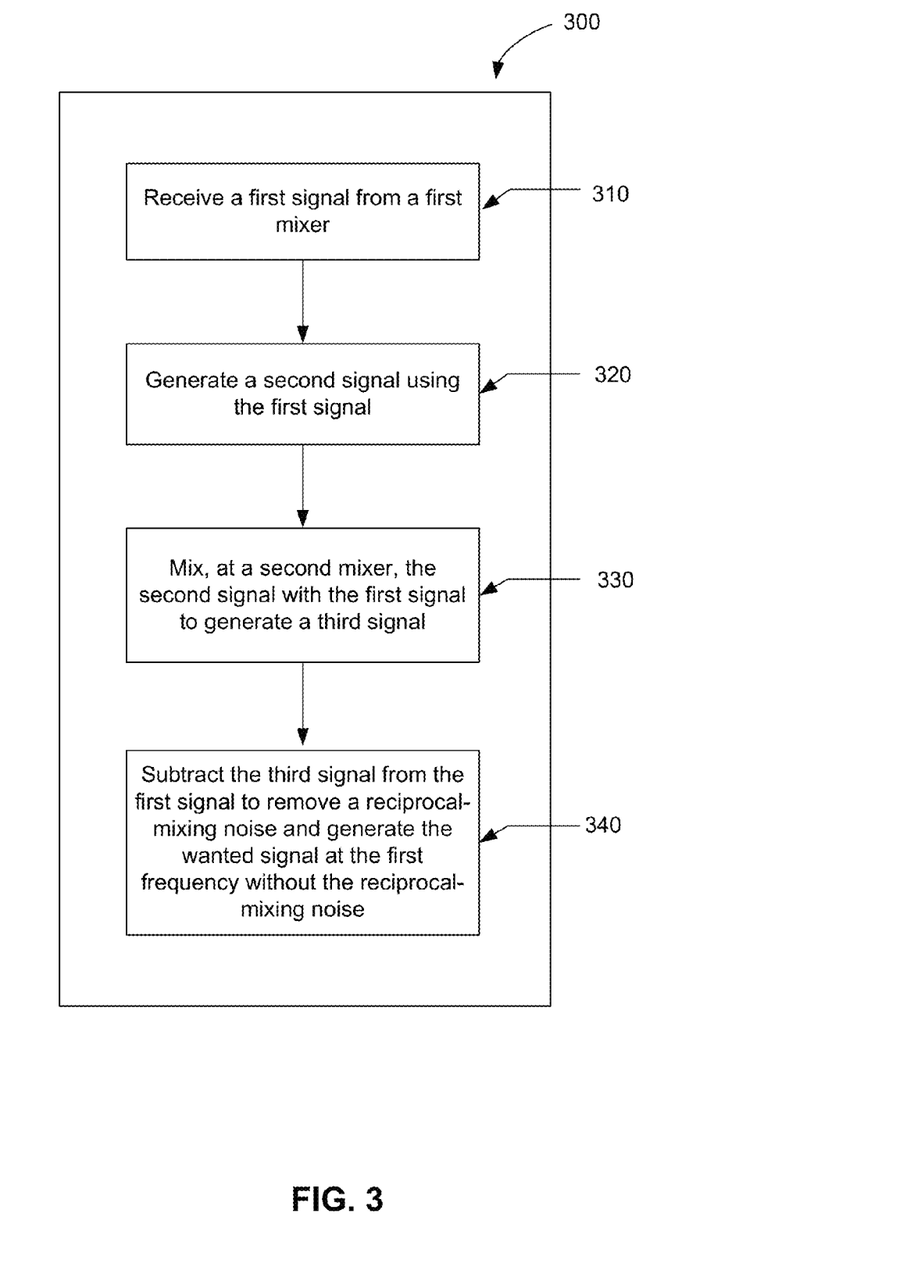
FIG. 3 illustrates a flow diagram of an example method for reciprocal mixing noise cancellation in accordance with one or more implementations.

FIG. 3 illustrates a flow diagram of an example method 300 for reciprocal mixing noise cancellation in accordance with one or more implementations. For explanatory purposes, example method 300 is described herein with reference to the system 200A of FIG. 2A; however, example method 300 is not limited to the system 200A of FIG. 2A. Further for explanatory purposes, the blocks of example method 300 are described herein as occurring in serial, or linearly. However, multiple blocks of example method 300 may occur in parallel. In addition, the blocks of example method 300 need not be performed in the order shown and/or one or more of the blocks of example method 300 need not be performed.

Method 300 may start at operation 310, where a first signal 206 of FIG. 2A may be received from a first mixer 210 of FIG. 2A. The first signal 206 may comprise a wanted signal 222 at a first frequency (e.g., DC) and a modulated signal 225 at a second frequency (e.g., blocker frequency $F_b$). The modulated signal 225 may result from a reciprocal-mixing of an unwanted signal (e.g., a narrow band blocker such as 101 of FIG. 1B) with a phase noise. The second frequency $F_b$ may be greater than the first frequency, and at least a portion of the modulated signal (e.g., portion 131 of FIG. 1B) may overlap the wanted signal 122 of FIG. 1B, adding a reciprocal-mixing noise to the wanted signal (e.g., 122 of FIG. 1B or 222 of FIG. 2A).

At operation 320, the carrier recovery module 240 of FIG. 2A may generate a second signal 208 of FIG. 2A, using the first signal 206. The second signal 208 may be a narrow signal at a third frequency (e.g., at twice the blocker frequency $2F_b$). The second mixer 230 of FIG. 2A, at operation 330, may mix the second signal 208 with the first signal 206 to generate a third signal 212 of FIG. 2A.

The subtraction module 260 of FIG. 2A may be configured to subtract the third signal 212 from the first signal 206 to remove a reciprocal-mixing noise (e.g., item 131 of FIG. 1B) and generate the wanted signal 222 at the first frequency (e.g., DC), free from the reciprocal-mixing noise (operation 340).

Figure 4:
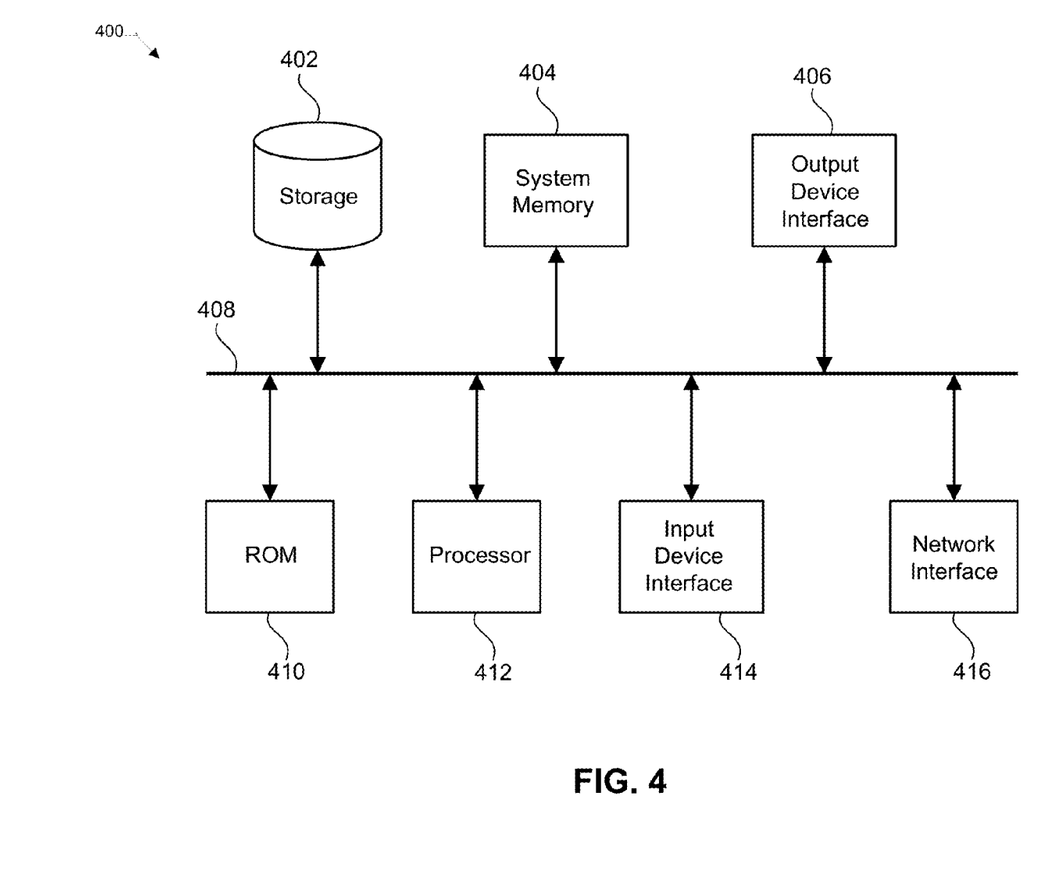
FIG. 4 conceptually illustrates an electronic system with which some implementations of the subject technology may be implemented.

FIG. 4 conceptually illustrates an electronic system 400 with which some implementations of the subject technology may be implemented. Electronic system 400, for example, can be a desktop computer, a laptop computer, a tablet computer, a server, a switch, a router, a base station, a receiver, a phone, a personal digital assistant (PDA), or generally any electronic device that transmits signals over a network. Such an electronic system may include various types of computer readable media and interfaces for various other types of computer readable media. Electronic system 400 includes bus 408, processing unit(s) 412, system memory 404, read-only memory (ROM) 410, permanent storage device 402, input device interface 414, output device interface 406, and network interface 416, or subsets and variations thereof.

Bus 408 collectively represents all system, peripheral, and chipset buses that communicatively connect the numerous internal devices of electronic system 400. In one or more implementations, bus 408 communicatively connects processing unit(s) 412 with ROM 410, system memory 404, and permanent storage device 402. From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. One or more implementations of the subject disclosure use a mass-storage device (such as a magnetic or optical disk and its corresponding disk drive) as permanent storage device 402.

Other implementations may use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as random access memory. System memory 404 stores any of the instructions and data that processing unit(s) 412 needs at runtime. In one or more implementations, the processes of the subject disclosure are stored in system memory 404, permanent storage device 402, and/or ROM 410. From these various memory units, processing unit(s) 412 retrieves instructions to execute and data to process in order to execute the processes of one or more implementations.

Bus 408 also connects to input and output device interfaces 414 and 406. Input device interface 414 enables a user to communicate information and select commands to the electronic system. Input devices used with input device interface 414 include, for example, alphanumeric keyboards and pointing devices (also called "cursor control devices"). Output device interface 406 enables, for example, the display of images generated by electronic system 400. Output devices used with output device interface 406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touch-screen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, bus 408 may also couple electronic system 400 to a network (not shown) through network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for reciprocal-mixing noise cancellation, the method comprising:
    receiving a first signal from a first mixer, the first signal comprising a wanted signal at a first frequency and a modulated signal at a second frequency, the modulated signal resulting from a reciprocal-mixing of an unwanted signal with a phase noise, wherein the second frequency is greater than the first frequency, and at least a portion of the modulated signal overlaps the wanted signal, adding a reciprocal-mixing noise to the wanted signal;
    generating a second signal using the first signal, the second signal being a narrow signal at a third frequency, wherein the third frequency is twice the second frequency;
    mixing, at a second mixer, the second signal with the first signal to generate a third signal; and
    subtracting the third signal from the first signal to remove a reciprocal-mixing noise and generate the wanted signal at the first frequency without the reciprocal-mixing noise.

2. The method of claim 1, wherein:
    a) the modulated signal results from reciprocal-mixing of the unwanted signal with a symmetrical phase noise frequency spectrum of a local oscillator (LO) of the first mixer,
    b) the first mixer is a down-conversion mixer,
    c) the first signal is a baseband signal, and
    d) the first frequency is a frequency substantially equal to zero.

3. The method of claim 1, wherein generating the second signal comprises performing carrier recovery on the first signal to isolate an unwanted portion of the first signal at the second frequency, and wherein the second frequency is a frequency of a blocker at an offset from a frequency of the wanted signal.

4. The method of claim 3, wherein performing carrier recovery on the first signal comprises using a phase-locked loop circuit locked to the second frequency, and wherein performing carrier recovery on the first signal further comprises optionally filtering the first signal using a band-pass filter centered at the second frequency.

5. The method of claim 3, wherein performing carrier recovery on the first signal further comprises performing a frequency multiplication to generate the second signal at the third frequency.

6. The method of claim 5, wherein the third signal comprises a mirror image of the first signal with respect to the second frequency, and a reciprocal mixing noise contribution, appeared in the vicinity of twice the second frequency in the first signal, appears at the first frequency in the third signal.

7. The method of claim 1, further comprising processing the third signal prior to subtraction from the first signal.

8. The method of claim 7, wherein processing of the third signal comprises at least one of amplifying or low pass filtering the third signal prior to subtraction from the first signal.

9. The method of claim 1, wherein the mixing comprises an up-conversion mixing using the second signal as a local oscillator.

10. A system for reciprocal mixing noise cancellation, the system comprising:
 a carrier recovery module configured to generate a second signal using a first signal received from a first mixer, wherein:
  a) the first signal comprises a wanted signal at a first frequency and a modulated signal at a second frequency, the modulated signal is generated as a product of a reciprocal-mixing of an unwanted signal with a phase noise,
  b) the second frequency is greater than the first frequency,
  c) at least a portion of the modulated signal overlaps the wanted signal, adding a reciprocal-mixing noise to the wanted signal, and
  d) the second signal is a narrow signal at a third frequency, wherein the third frequency is twice the second frequency;
 a second mixer circuit to mix the second signal with the first signal to generate a third signal; and
 a subtraction circuit to subtract the third signal from the first signal to remove a reciprocal-mixing noise and generate the wanted signal at the first frequency without the reciprocal-mixing noise.

11. The system of claim 10, wherein:
 a) the modulated signal is a product of reciprocal-mixing of the unwanted signal with a symmetrical phase noise frequency spectrum of a local oscillator (LO) of the first mixer,
 b) the first mixer is a down-conversion mixer,
 c) the first signal is a baseband signal, and
 d) the first frequency is a frequency substantially equal to zero.

12. The system of claim 10, wherein the carrier recovery module is configured to generate the second signal by isolating an unwanted portion of the first signal at the second frequency, and wherein the second frequency is a frequency of a blocker at an offset from a frequency of the wanted signal.

13. The system of claim 12, wherein the carrier recovery module comprises a phase-locked loop circuit configured to lock to the second frequency, and wherein the carrier recovery circuit further comprises an optional band-pass filter centered at the second frequency.

14. The system of claim 12, wherein the carrier recovery module further comprises a frequency multiplication circuit configured to generate the second signal at the third frequency.

15. The system of claim 12, wherein second mixer circuit is configured to generate the third signal that is a mirror image of the first signal with respect to the second frequency, and a reciprocal mixing noise contribution, appeared in the vicinity of twice the second frequency in the first signal, appears at the first frequency in the third signal.

16. The system of claim 10, further comprising a gain stage configured to amplify the third signal prior to subtraction from the first signal.

17. The system of claim 16, further comprising a low-pass filter configured to filter the amplified third signal prior to subtraction from the first signal.

18. The system of claim 10, wherein the second mixer circuit comprises a complex mixer circuit configured to generate in-phase and quadrature (IQ) outputs.

19. A non-transitory machine-readable medium embodying instructions that, when executed by a machine, allow the machine to perform a method for reciprocal-mixing noise cancellation, the method comprising:
 receiving a first signal comprising a wanted signal at a first frequency and a modulated signal at a second frequency, the modulated signal resulting from a reciprocal-mixing of an unwanted signal with a phase noise, wherein the second frequency is greater than the first frequency, and at least a portion of the modulated signal overlaps the wanted signal, adding a reciprocal-mixing noise to the wanted signal;
 generating a second signal using the first signal, the second signal being a narrow signal at a third frequency, wherein the third frequency is twice the second frequency;
 mixing the second signal with the first signal to generate a third signal; and
 subtracting the third signal from the first signal to remove a reciprocal-mixing noise and generate the wanted signal at the first frequency without the reciprocal-mixing noise.

20. The non-transitory machine-readable medium of claim 19, wherein:
 a) the modulated signal results from reciprocal-mixing of the unwanted signal with a symmetrical phase noise spectrum of a local oscillator (LO),
 b) the first signal is a baseband signal,
 c) the first frequency is a frequency substantially equal to zero,
 d) generating the second signal comprises performing carrier recovery on the first signal to isolate the unwanted signal portion of the first signal at the second frequency, and
 e) the second frequency is a frequency of a blocker at an offset from a frequency of the wanted signal.

* * * * *